United States Patent

Yamada et al.

[11] 3,929,842
[45] Dec. 30, 1975

[54] ANTHRAQUINONE DISPERSE DYES

[75] Inventors: Eiji Yamada, Ibaragi; Masao Nishikuri, Hirakata, both of Japan

[73] Assignee: Sumitomo Chemical Company, Limited, Osaka, Japan

[22] Filed: Aug. 27, 1973

[21] Appl. No.: 391,872

[30] Foreign Application Priority Data
Sept. 6, 1972  Japan .................... 47-89818

[52] U.S. Cl. .................... 260/376; 8/39; 260/377; 260/378; 260/380; 260/381; 260/383
[51] Int. Cl.² .................... C09B 1/54; C09B 1/56
[58] Field of Search .................... 260/376

[56] References Cited
UNITED STATES PATENTS
3,538,129  11/1970  Sato et al. .................... 260/376
3,689,510  9/1972  Kolliker .................... 260/376

OTHER PUBLICATIONS
March, Advanced Organic Chemistry, Reactions, Mechanisms & Structure, pp. 584–585 (1968).

*Primary Examiner*—Lorraine A. Weinberger
*Assistant Examiner*—E. Jane Skelly
*Attorney, Agent, or Firm*—Stevens, Davis, Miller & Mosher

[57] ABSTRACT

A disperse dye of the formula,

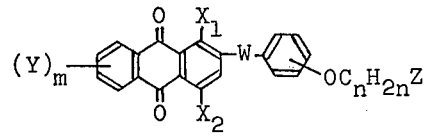

wherein $X_1$ and $X_2$ each are an amino or hydroxyl group, Y is a halogen atom, W is an oxygen or sulfur atom, Z is cyano group, or a group of the formula —CONHR or —COOR in which R is a hydrogen atom, an unsubstituted or substituted alkyl group or an unsubstituted or substituted phenyl group, $n$ is an integer of from 1 to 7, and $m$ is 0, 1 or 2, which is suitable for dyeing synthetic fibers such as polyester fibers with a high color value and good fastnesses.

4 Claims, No Drawings

ANTHRAQUINONE DISPERSE DYES

The present invention relates to a new anthraquinone disperse dye suitable for dyeing synthetic fibers of the following formula;

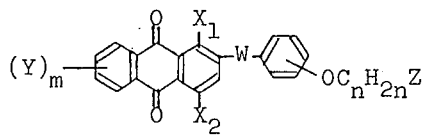

wherein
- $X_1$ and $X_2$ each are an amino or hydroxyl group,
- Y is a halogen atom,
- W is an oxygen or sulfur atom,
- Z is a —CN, or a group of the formula, —CONHR or —COOR group in which R is a hydrogen atom, an alkyl group which may be substituted with a lower alkoxy or phenyl group or a halogen atom; or a phenyl group which may be substituted with a lower alkyl or lower alkoxy group or a halogen atom,
- n is an integer of from 1 to 7, and
- m is 0, 1 and 2.

In the present invention each term "alkyl" and "alkoxy" is intended to mean an alkyl group having 1 to 8 carbon atoms and an alkoxy group having 1 to 4 carbon atoms.

The present inventors have found, as a result of a study on the synthesis and application of anthraquinone series dyes, that the new compounds of the formula (I) have a high affinity to synthetic fibers, particularly to polyester fibers and high fastnesses. In addition, it has been found that the present dyes give dyeings of a bright orange to violet shade on the said synthetic fibers having a high colour value and good fastnesses to light, sublimation, washing, and finishing processes such as resin finishing, by means of a dip dyeing, printing, thermosol dyeing, solvent dyeing or heat transfer process.

The new disperse dye of the present invention is prepared by reacting an o-, m- or p-hydroxyphenoxy(or hydroxythiophenoxy-) anthraquinone of the formula (II);

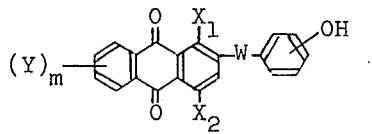

wherein $X_1$, $X_2$, Y, W and m are each as defined above, with a compound of the formula (III);

wherein B is a halogen atom, and Z and n are respectively as defined above. Alternatively, the new dye of the formula (I) in which n is an integer of 2 or more may be prepared by reacting the above-mentioned compound (II) with an olefin of the formula (IV);

wherein Z is as defined above, n is an integer of from 2 to 7, and a double bond is located at the end thereof.

The compounds of the formula (II) employed in the present invention more specifically include, 1-amino-2-(4-hydroxyphenoxy)-4-hydroxyanthraquinone, 1-amino-2-(2-hydroxyphenoxy)-4-hydroxyanthraquinone, 1-amino-2-(3-hydroxyphenoxy)-4-hydroxyanthraquinone, 1-amino-2-(4-hydroxyphenoxy)-4-hydroxy-5-chloroanthraquinone, 1-amino-3-(hydroxyphenoxy)-4-hydroxyanthraquinone, 1-amino-2-(4-hydroxyphenoxy)-4-hydroxy-5-bromoanthraquinone, 1,4-dihydroxy-2-(4-hydroxythiophenoxy)-anthraquinone, 1,4-diamino-2-(4-hydroxyphenoxy)-anthraquinone, 1,4-dihydroxy-2-(3-hydroxyphenoxy)-anthraquinone, 1,4-diamino-2-(4-hydroxythiophenoxy)-anthraquinone, and 1,4-dihydroxy-2-(4-hydroxyphenoxy)-anthraquinone.

The compounds of the formula (III) include chloroacetic acid, methyl chloroacetate, ethyl chloroacetate, n-propyl chloroacetate, i-propyl chloroacetate, n-butyl chloroacetate, i-butyl chloroacetate, t-butyl chloroacetate, n-hexyl chloroacetate, n-octyl chloroacetate, phenyl chloroacetate, methyl bromoacetate, ethyl bromoacetate, n-propyl bromoacetate, n-butyl bromoacetate, n-hexyl bromoacetate, chloro-N-methylacetamide, chloro-N-ethylacetamide, chloro-N-n-propylacetamide, β-chloropropionic acid, methyl β-chloropropionate, ethyl β-chloropropionate, n-propyl β-chloropropionate, i-propyl β-chloropropionate, n-butyl β-chloropropionate, n-hexyl β-chloropropionate, n-octyl β-chloropropionate, β-chloropropionitrile, β-chloro-N-methylpropioamide, β-chloro-N-ethylpropioamide, γ-chlorobutyric acid, methyl γ-chlorobutyrate, ethyl γ-chlorobutyrate, n-propyl γ-chlorobutyrate, n-butyl γ-chlorobutyrate, γ-chlorobutyronitrile, methyl chlorovalerate, ethyl chlorovalerate, methyl chlorocaproate, ethyl chlorocaproate, methyl chlorocaprate and ethyl chlorocaprate.

The reaction between the compounds of the formula (II) and the formula (III) can be carried out at from 50° to 150°C in the presence of a base in an inert solvent or a dipolar aprotic solvent. The inert solvents include benzene, toluene, chlorobenzene, dichlorobenzene, trichlorobenzene, nitrobenzene, perchloroethylene, and trichloroethylene. The dipolar aprotic solvents include dimethylsulfoxide, dimethylformamide, N-methylpyrrolidone and dimethylacetamide. The bases include pyridine, piperidine, sodium carbonate, potassium carbonate and potassium hydroxide. When two or more of the compounds of the formula (III) are used in combination, aimed dyes are obtained as a mixture.

Since the dipolar aprotic solvents generally accelerate the reaction, a catalyzer is not necessary in the reaction using the solvents. On the other hand, when the inert solvents are used, it is necessary for accelerating the reaction to add a small amount of a mixture of a quaternary ammonium hydroxide and iodine or potassium iodide. The examples of the quaternary ammonium hydroxide include tetramethyl ammonium hydroxide, benzyltrimethyl ammonium hydroxide and 2-hydroxyethyl trimethyl ammonium hydroxide.

The olefins of the formula (IV) more specifically include, acrylonitrile, methyl acrylate, ethyl acrylate, n-propyl acrylate, i-propylacrylate, n-butyl acrylate, methyl methacrylate, ethyl methacrylate and n-propyl methacrylate. These olefins are reacted with the above-mentioned o-, m- or p-hydroxyphenoxy- (or hydroxythiophenoxy-) anthraquinones at from 50° to 150°C in the inert solvents containing the bases or quaternary ammonium hydroxides to produce the present dyes.

The new anthraquinone compounds of the formula (I) alone or in admixture of two or more thereof can be applied advantageously not only to dyeing of yarns, fabrics, loose fibers, knitted fabrics and non-woven fabrics made of various synthetic fibers including polyamides, polyacrylonitriles, polyesters and cellulose esters, but also to dyeing of blends and union fabrics thereof with natural fibers. Among these fibers, polyesters such as polyethyleneterephthalate, poly-1,4-cyclohexylene dimethylene terephthalate, and modified fibers thereof in which terephthalic acid is partially substituted with sebacic acid, isophthalic acid or hexahydroterephthalic acid, and cellulose esters such as cellulose triacetate and cellulose 2½-acetate are particularly preferred.

The materials can be dyed by various dyeing methods which are well known in the art, for example, an atmospheric or pressure dyeing at 80° to 130°C, carrier dyeing, thermosol dyeing including a dry heat treating at 180° to 220°C, solvent dyeing using perchloroethylene or trichloroethylene, heat transfer printing in which dyes printed on transfer paper are treated by a thermosol process at an atmospheric or under a reduced pressure, and printing using a high pressure steam. Thus, dyeings of a bright orange to violet shade having a high color value and very good fastnesses to light, washing, gas and finishing processes such as resin finishing are obtained.

The present invention will be illustrated more specifically with reference to the following examples which are only given for the purpose of illustration and are not to be interpreted as limiting. In the examples all parts are by weight.

EXAMPLE 1

5.3 Parts of ethyl chloroacetate were added dropwise to a mixture of 5.0 parts of 1-amino-2-(4-hydroxyphenoxy)-4-hydroxyanthraquinone, 15 parts of N-methylpyrrolidone and 3 parts of potassium carbonate, at 60°C over about 30 minutes while stirring, and the reaction mixture was kept at the same temperature for 4 hours. After the disappearance of the starting materials was ascertained, the mixture was cooled to room temperature and diluted with methanol. The precipitated crystals were filtered, washed with methanol and water, and dried. Thus, 4.9 parts of the compound of the formula (m.p. 187°–190°C) were obtained.

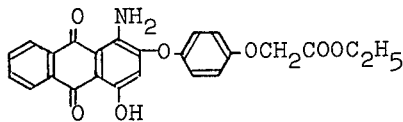

The compound thus obtained gave dyeings of a bright red shade on polyethyleneterephthalate having excellent fastnesses to light, sublimation, washing and the like.

EXAMPLE 2

3.2 Parts of n-butyl chloroacetate were added dropwise to a mixture of 5.0 parts of 1-amino-2-(4-hydroxyphenoxy)-4-hydroxyanthraquinone, 20 parts of dimethylformamide and 3 parts of potassium carbonate, at 80°C over 30 minutes while stirring, and then the reaction mixture was maintained at the same temperature for 2 hours. After the disappearance of the starting materials was ascertained, by means of thin-layer chromatography, the mixture was diluted with 20 parts of water. The precipitated crystals were filtered, washed with methanol and water, and then dried to give 5.1 parts of a new dye of the formula (m.p. 138°–149°C).

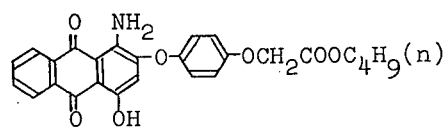

EXAMPLE 3

3 Parts of methyl chloroacetate were added dropwise to a mixture of 5.0 parts of 1-amino-2-(4-hydroxyphenoxy)-4-hydroxyanthraquinone, 20 parts of nitrobenzene, 2.5 parts of potassium carbonate, 0.1 part of potassium iodide, and 0.2 part of benzyltrimethyl ammonium hydroxide, at 100°C over about 30 minutes while stirring, and then the reaction mixture was maintained at the same temperature for 3 hours. After the disappearance of the starting materials was ascertained, the mixture was cooled to 60°C, and diluted with 20 parts of methanol. The precipitated crystals were filtered, washed with methanol and water, and then dried to give 5.2 parts of a new dye of the formula (m.p. 203°–207°C).

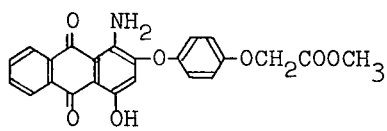

EXAMPLES 4 to 29

According to the procedure similar to that described in Example 1, 2 or 3, o-, m- or p-hydroxyphenoxy- (or hydroxythiophenoxy-) anthraquinones shown in the following Table was reacted with a compound of the formula (III), whereby the objective dyes shown in the right column of the Table were obtained.

Table

| Example | Hydroxy-(thio)phehenoxy-anthraquinone | Compounds of the formula (III) | Chemical structructure and shades on polyester of product | |
|---|---|---|---|---|
| 4 | [1-amino-2-(hydroxyphenoxy)-4-hydroxyanthraquinone structure] | ClCH₂COOCH₃ | [product structure with OCH₂COOCH₃] | (Bright red) |
| 5 | [Br-substituted hydroxyphenoxy anthraquinone structure] | " | [Br-substituted product structure with OCH₂COOCH₃] | (Bluish red) |

Table — Continued

| Example | Hydroxy-(thio)phenoxy-anthraquinone | Compounds of the formula (III) | Chemical structure and shape on polyester of product |
|---|---|---|---|
| 6 | 1-amino-2-(4-hydroxyphenoxy)-4-hydroxyanthraquinone | ClCH₂COO-n-C₃H₇ | 1-amino-2-[4-(n-propoxycarbonylmethoxy)phenoxy]-4-hydroxyanthraquinone (red) |
| 7 | 1-amino-2-(4-hydroxyphenoxy)-4-hydroxy-8-chloroanthraquinone | ClCH₂COOC₂H₅ | (Slightly bluish red) |
| 8 | 1-amino-2-(4-hydroxyphenoxy)-4-hydroxyanthraquinone | ClCH₂CH₂COOC₂H₅ | (Bright red) |
| 9 | '' | BrCH₂CH₂CN | (Bright red) |
| 10 | '' | ClCH₂CONH₂ | (Bright red) |
| 11 | '' | ClCH₂CH₂CH₂COOC₂H₅ | (Bright red) |
| 12 | 1-amino-2-(4-hydroxyphenoxy)-4-hydroxyanthraquinone | ClCH₂CONHCH₃ | (Bright red) |
| 13 | 1-amino-2-(4-hydroxyphenylthio)-4-hydroxyanthraquinone | ClCH₂COOCH₃ | (Bluish red) |
| 14 | 1,4-dihydroxy-2-(4-hydroxyphenylthio)anthraquinone | ClCH₂COOC₂H₅ | (Orange) |
| 15 | '' | ClCH₂CH₂COOCH₃ | (Orange) |
| 16 | 1,4-dihydroxy-2-(4-hydroxyphenoxy)anthraquinone | ClCH₂COOC₂H₅ | (Yellowish orange) |
| 17 | 1,4-diamino-2-(4-hydroxyphenoxy)anthraquinone | ClCH₂COOCH₃ | (Violet) |

Table —Continued

| Example | Hydroxy-(thio)phenonoxy-anthraquinone | Compounds of the formula (III) | Chemical structure and shade on polyester of product |
|---|---|---|---|
| 18 | " | CℓCH$_2$CH$_2$COOCH$_3$ | 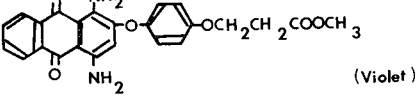 (Violet) |
| 19 | 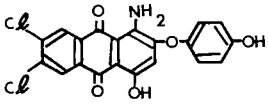 | CℓCH$_2$COOCH$_2$CH$_2$OCH$_3$ | 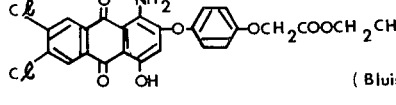 (Bluish red) |
| 20 | 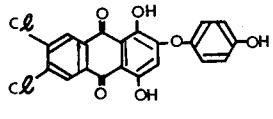 | CℓCH$_2$COOC$_2$H$_4$—⟨phenyl⟩ |  (Orange) |
| 21 | 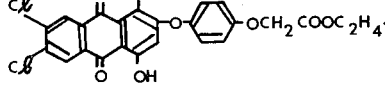 | CℓCH$_2$COO-i-C$_3$H$_7$ | 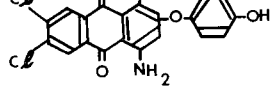 (Bluish violet) |
| 22 | 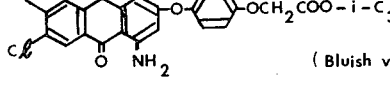 | CℓCH$_2$COOC$_2$H$_5$ | 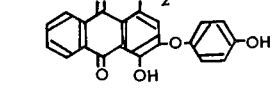 (Red) |
| 23 | " | CℓCH$_2$COO-n-C$_5$H$_{11}$ | 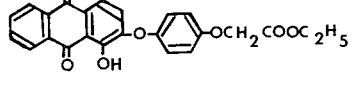 (Red) |
| 24 | 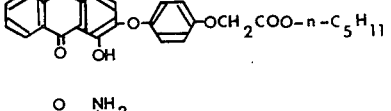 | CℓCH$_2$COO—⟨phenyl⟩ | 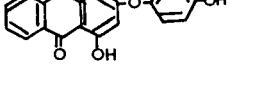 (Bright red) |
| 25 | " | CℓCH$_2$COO—⟨phenyl⟩—Cℓ |  (Bright red) |
| 26 | " | CℓCH$_2$COO—⟨phenyl⟩—CH$_3$ |  (Bright red) |
| 27 | " | CℓCH$_2$CHCOOCH$_3$<br>     \|<br>    CH$_3$ | 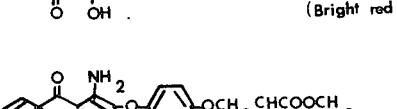 (Bright red) |
| 28 | 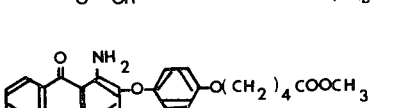 | Cℓ(CH$_2$)$_4$COOCH$_3$ | 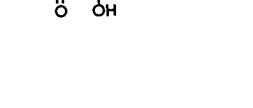 (Bright red) |
| 29 | | BrCH$_2$CH$_2$·C(CH$_3$)$_2$CH$_2$COOC$_2$H$_5$ | 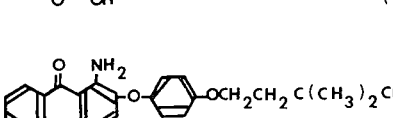 (Bright red) |

EXAMPLE 30

A mixture of 5.0 parts of 1-amino-2-(4-hydroxyphenoxy)-4-hydroxyanthraquinone, 20 parts of nitrobenzene, 0.5 part of benzyltrimethylammonium hydroxide and 4.4 parts of ethyl acrylate was reacted at 130°C. After the disappearance of the starting materials was ascertained, the mixture was cooled to 60°C, and diluted with 20 parts of methanol. The precipitated crystals were filtered, washed with methanol and water, and then dried to give 4.0 parts of a new dye of the following formula (m.p. 162°-170°C).

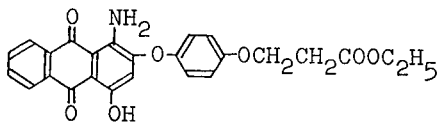

EXAMPLE 31

A mixture of 3 parts of the compound of the formula,

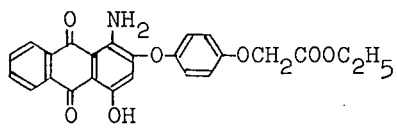

7 parts of a dispersing agent containing sodium dinaphthylmethanedisulfonate as a main component, and 20 parts of water was pulverized in a ball mill for 20 hours. The dispersion thus obtained was spraydried to give 10 parts of a dyeing agent. 25 Parts of polyethylene terephthalate spun yarns were introduced into a dye bath containing 1 part of the dyeing agent and 1,000 parts of water, and dyed at 130°C for 60 minutes under pressure. Then the dyed yarns were hot-rinsed, subjected to a reduction cleaning and dried to give dyeings of a bright red shade having a high color value. The dyeings had excellent all-round fastnesses including lightfastness and washing fastness after finishing processes such as antistatic finish, water-proofing finish, hand-adjusting finish and the like.

EXAMPLE 32

15 Parts of a new dye of the following formula,

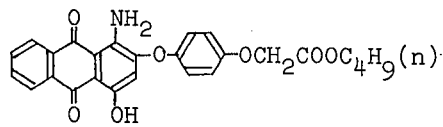

were dispersed in 1,000 parts of water with a suitable amount of dispersing agent, and 1 part of sodium alginate was further added thereto. Fibric made of polyethylene terephthalate fibers was introduced into the dispersion, passed through mangles to squeeze the liquor in excess of about 60% of the weight of the fabric, and pre-dried in a hot flue. The fabric was then given a dry-heat treating at 200°C for 90 seconds to fix the dye thereon. After the fabric was developed by the thermosol treatment, it was subjected to a reduction cleaning, rinsing and drying. The dyeings thus obtained had a bright red shade having fastness to light, sublimation and finishing processes.

EXAMPLE 33

10 Parts of a dyeing agent were obtained from 3 parts of the compound of the formula,

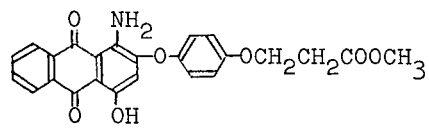

in the same manner as described in Example 31. 1 Part of the dyeing agent thus obtained, 4 parts of o-phenylphenol, 2 parts of acetic acid were added to 1,000 parts of water to prepare a dye bath. 20 Parts of polyethylene terephthalate spun yarns were introduced into the dye bath and dyed at 100°C for 90 minutes. The dyed yarns were subjected to hot rinsing, reduction cleaning and then drying to give dyeings of a red shade having excellent fastnesses to light, sublimation, washing and finishing process.

What is claimed is:

1. A compound of the formula,

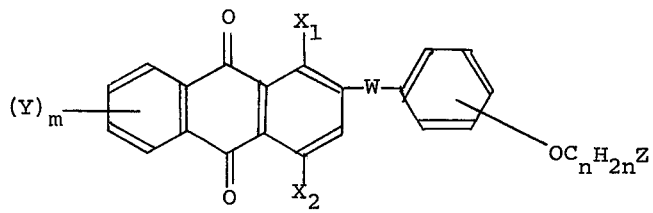

wherein $X_1$ and $X_2$ each are an amino or hydroxyl group, Y is a halogen atom, W is an oxygen or sulfur atom, Z is —COOR in which R is a hydrogen atom, a $C_1$–$C_8$ alkyl group unsubstituted or substituted with a lower alkoxy or phenyl group or a halogen atom, or a phenyl group unsubstituted or substituted by a lower alkyl or alkoxy group or a halogen atom, n is an integer of from 1 to 7, and m is 0, 1 or 2.

2. A compound according to claim 1, wherein R is methyl or ethyl group.

3. A compound of the formula,

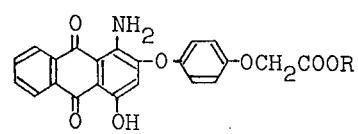

wherein R is a lower alkyl group.

4. A compound according to claim 3, wherein R is methyl or ethyl group.

* * * * *